Oct. 29, 1935.                J. W. WHITE                 2,018,754
                                ACTUATOR
                           Filed Sept. 18, 1933
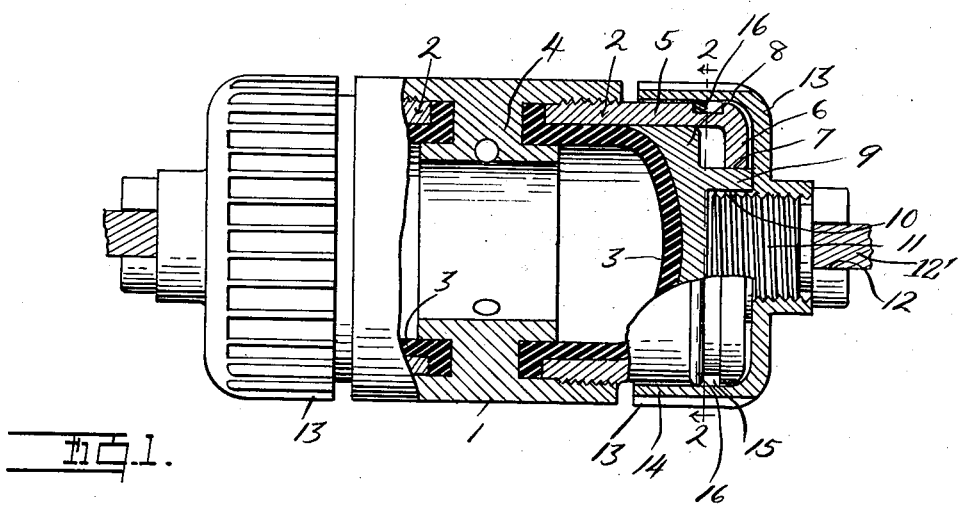
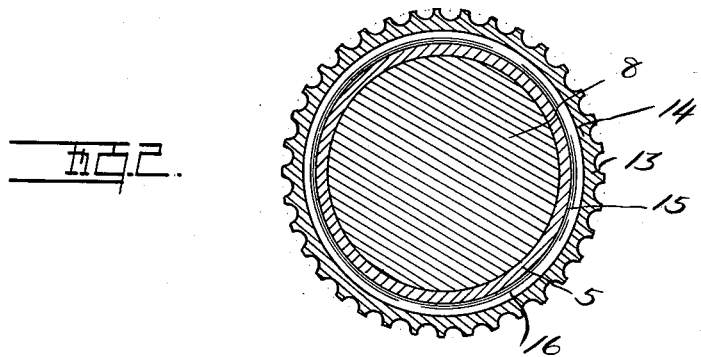
INVENTOR
John William White
BY
ATTORNEYS Patented Oct. 29, 1935

2,018,754

UNITED STATES PATENT OFFICE 2,018,754

ACTUATOR

John William White, Detroit, Mich., assignor, by mesne assignments, to General Motors Corporation, a corporation of Delaware Application September 18, 1933, Serial No. 689,983

6 Claims. (Cl. 188—79.5)

The invention relates to actuators and refers more particularly to hydraulic actuators. The invention is applicable to actuators of that type having relatively movable telescoping tubular members and is particularly applicable to hydraulic actuators of that type having a housing member and a reciprocable member telescoping the housing member and operatively connected to a brake and adapted to be operated by means extending within the housing member.

One of the objects of the invention is to provide an improved construction of actuator which provides for the relative movement of the tubular members and which also effectively seals the actuator so that liquid and dirt cannot pass into the actuator between the tubular members. More particularly, the invention has for one of its objects to so form the hydraulic actuator for a brake that the movement of the reciprocable member relative to the housing member is provided for and at the same time the actuator is effectively sealed so that liquid and dirt cannot pass into the actuator between the housing and reciprocable members. Another object is to so form the construction that the sealing member has rolling contact with both of the relatively movable members.

These and other objects of the invention will become apparent from the following description, taken in connection with the accompanying drawing, in which Figure 1 is a sectional elevation of an actuator showing an embodiment of my invention;

Figure 2 is a cross section on the line 2—2 of Figure 1.

The actuator, as illustrated, has the central housing member 1, the tubular end housing members 2 and the flexible cup-shaped diaphragms 3 which are preferably formed of rubber. The edges of these diaphragms are clamped between the radially inwardly extending portion 4 of the central housing member and the inner ends of the end housing members 2. Each of the end housing members has the cylindrical wall 5 and the outer end wall 6, which latter is centrally apertured at 7. 8 is a piston abutting each diaphragm and located within the associated end housing member. This piston has the reduced portion or stem 9 which slidably extends through the opening 7 and which is provided with the axial recess or bore 10.

For applying the brake by actuating the brake friction means or brake shoe when the actuating fluid is forced into the chamber formed by the diaphragms 3 and the central portion 4 of the central housing member, I have provided the screw 11 freely extending into the recess or bore 10 of each piston and operatively connected at its outer end to an end of the brake shoe. As shown, the outer end of each screw is formed with the slot 12 which is adapted to receive the adjacent bracket 12' upon an end of the brake shoe. I have also provided the tubular nut 13 threaded upon each screw 11 and having the annular portion 14 which telescopically engages over the cylindrical portion 5 of the adjacent end housing member. The inner face of this annular portion is cylindrical. The reduced portion or stem 7 of the associated piston is adapted to engage the nut upon outward movement of the piston and this nut through the screw engaged thereby is adapted to actuate the brake shoe forcing the same toward the annular flange of the brake drum.

With this construction, it will be seen that the nut serves to protect the interior of the actuator from liquid and dirt.

To effectively seal the actuator so that liquid and dirt cannot enter the same between each pair of end housing members and reciprocable nuts, I have formed in the outer face of the cylindrical portion 2 of each end housing member the annular groove 15 and I have provided the annular yieldable annulus 16 in this groove. This annulus is preferably formed of rubber and has a circular cross section and the width of the groove 15 is greater than the diameter of the cross section of the annulus. This diameter is such that upon reciprocable movement of the nut relative to its associated housing member the annulus has rolling engagement with the bottom of the groove and the inner face of the nut. The width of the groove 15 need only be equal to one half the travel of the nut, plus the diameter of the cross section of the annulus. It will thus be seen that the annulus provides for reciprocable movement of the nut associated therewith and at the same time effectively seals the actuator from liquid and dirt which might otherwise pass between the housing member and the associated nut. At the same time the area of contact of the annulus with its nut is such that the nut may be rotated to provide for the proper clearance between the brake shoe and the brake drum when the brake shoe is retracted. However, the frictional resistance offered by each annulus to rotation of its nut serves to assist in holding the nut in its adjusted position of rotation.

What I claim as my invention is:

1. In an actuator, a housing member, reciprocating means within said housing member and projecting therefrom, adjustment means operatively connected with said reciprocating means to move therewith, and being rotatable relative thereto to effect adjustment, said means including a portion telescoping over said housing member, and sealing means between said housing member and telescoping portion having anti-friction engagement therewith as to relative reciprocating movement and friction engagement as to relative rotational movement whereby accidental change of adjustment is prevented.

2. In an actuator, a housing member, reciprocating means within said housing member and projecting therefrom, adjustment means operatively connecting with said reciprocating means to move therewith and being rotatable relative thereto to effect adjustment, said means including a portion telescoping over said housing member and sealing means between said housing member and telescoping portion comprising an annulus of resilient material and of circular cross section in rolling contact with opposed parallel faces on said members constituting a frictional resistance to relative rotation thereof.

3. In an actuator, a housing member, reciprocating means within said housing member and projecting therefrom, longitudinally adjustable means intermediate said reciprocating means and member to be actuated thereby including non-revoluble and revoluble threadedly engaged members, said revoluble member having a portion telescoping over said housing member and sealing means between said telescoping portion and housing member comprising an annulus of resilient material and of circular cross section having rolling contact with parallel faces of said members and frictionally resisting relative rotation thereof.

4. In an actuator including telescopically engaging relatively reciprocating and relatively rotatable members, sealing means therebetween having anti-friction engagement therewith as to relative reciprocating movement and friction engagement for resisting relative rotation thereof.

5. In an actuator including telescopically engaging relatively reciprocating and relatively rotatable members, sealing means between said members comprising an annulus of resilient material and of circular cross section in rolling anti-friction engagement with opposed parallel faces of said members, said annulus frictionally resisting relative rotation of said members.

6. An actuator including telescopically engaged relatively reciprocating and relatively rotatable members, one of said members having an annular groove therein with its bottom face parallel to a face on the other member and sealing means between said members including an annulus of resilient material and of circular cross section arranged in said groove and in rolling contact with the parallel faces during relative reciprocating movement thereof, said annulus constituting a frictional resistance to relative rotation.

JOHN WILLIAM WHITE.